United States Patent [19]

Ramm et al.

[11] Patent Number: 4,644,804
[45] Date of Patent: Feb. 24, 1987

[54] QUARTZ RESONATING FORCE AND PRESSURE TRANSDUCER

[75] Inventors: A. Jürgen Ramm, Kriens; Jerome Formaz, Evilard, both of Switzerland

[73] Assignee: Franz Rittmeyer AG, Grienbachstrasse, Switzerland

[21] Appl. No.: 631,811

[22] Filed: Jul. 17, 1984

[51] Int. Cl.⁴ .................. G01L 1/10; G01L 1/16
[52] U.S. Cl. .................... 73/862.59; 73/702; 310/338
[58] Field of Search ............ 73/DIG. 1, DIG. 4, 702, 73/703, 517 AV, 862.59, 862.68; 310/338; 331/65

[56] References Cited

U.S. PATENT DOCUMENTS

| | | | |
|---|---|---|---|
| 2,969,514 | 1/1961 | Curtis | 73/720 X |
| 3,392,576 | 7/1968 | Hollander, Jr. | 310/338 X |
| 3,505,875 | 4/1970 | Benner, Jr. | 73/720 |
| 4,339,011 | 7/1982 | DiMarzio | 310/338 X |
| 4,435,986 | 3/1984 | Choffat | 73/702 |
| 4,479,070 | 10/1984 | Frische et al. | 73/703 X |

FOREIGN PATENT DOCUMENTS

| | | | |
|---|---|---|---|
| 0060832 | 5/1980 | Japan | 73/702 |
| 0501305 | 1/1976 | U.S.S.R. | 73/862.68 |

Primary Examiner—Charles A. Ruehl
Attorney, Agent, or Firm—Lewis H. Eslinger

[57] ABSTRACT

A thin, piezoelectric membrane provided on both surfaces with electrodes, which may be disc-shaped or ring-shaped, is made to oscillate in the piezoelectric manner and the membrane is arranged to have some exterior force or pressure applied thereto, whereby changes in the frequency of oscillation are in response to the size of the force exerted on the membrane.

10 Claims, 11 Drawing Figures

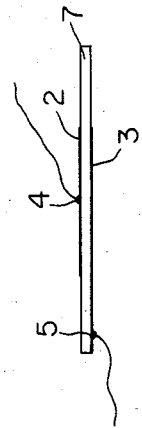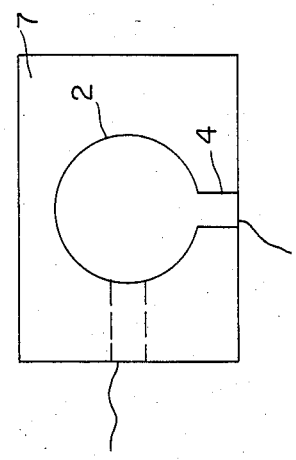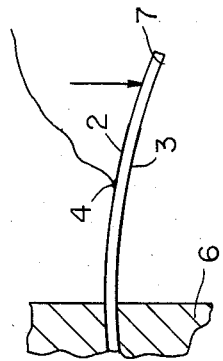
FIG.1a  FIG.1b  FIG.1c
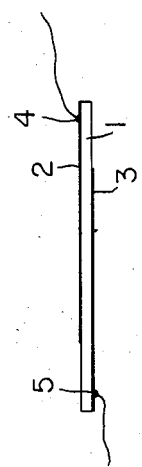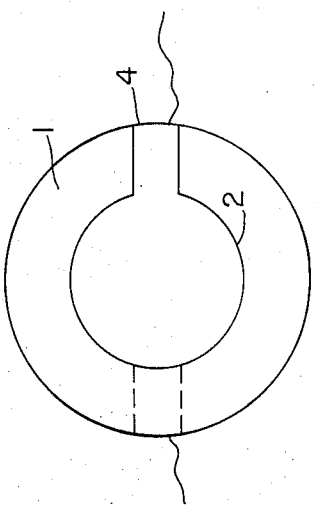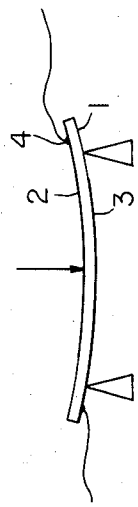
FIG.2a  FIG.2b  FIG.2c

QUARTZ RESONATING FORCE AND PRESSURE TRANSDUCER

BACKGROUND OF THE INVENTION

The present invention relates to a device for measuring forces and pressures which lead to the deformation of an oscillating piezoelectric membrane, whereby the change in the natural frequency of this membrane constitutes a measure of the size of the deformation and, consequently, a measure of the size of the force causing the deformation.

There are many applications for force transducers in science and technology. On the one hand, these transducers are used for direct force measurement in scales and accelerometers while, on the other hand, they are also widely applied for measuring the pressure of fluids and gases.

It is known that certain natural or artificial crystals can be used as force transducers based on piezoelectric excitation. An exceptionally high elasticity accompanied by practically negligible hysteresis, as well as the chemical stability of the single-crystal structure, make quartz a suitable basic material for such transducers with long-term stability.

As a function of its cut and geometric shape, quartz can be excited piezoelectrically and produce natural oscillations which, in the case of resonance, possess a high Q value (in an oscillating system this is the ratio of energy stored to energy lost during one oscillation). This permits quartz to operate in an oscillator circuit with a weak or low-power, external energy source. If the internal energy of the quartz changes, for example, due to a change in temperature or due to mechanical deformation, with no actual change in the Q value of the system, that is, there is no sizable attenuation of the system, the result will be a change in the natural frequency of resonance of the quartz crystal. Consequently, the frequency will be a direct measure of, for example, the deformation of the quartz, and the signal can be further processed as a digital signal without additional conversion.

Therefore, the design of a quartz resonating force and pressure transducer must be such that the externally operating force does not actually change the Q value of the system. For that reason, the mounting of the quartz resonating force and pressure transducer is very important. Moreover, one has to make sure that it does not affect the oscillation ratio of the quartz.

These necessary conditions for a quartz resonating force and pressure transducer (QRFPT) with resonance oscillations could, until now, only be met by the external design of the quartz and the mounting system.

Some examples of quartz resonating force and pressure transducers can be found in the following U.S. Pat. Nos.: 3,399,572; 3,470,400; 3,479,536; 3,505,866; 4,020,448; 4,067,241; 4,091,679; and 4,104,920. The quartz resonating force and pressure transducers according to U.S. Pat. Nos. 4,215,279; and 4,372,173 are somewhat easier to operate.

Nevertheless, these transducers also present mounting problems, in particular with regard to the occurrence of undesired oscillations.

OBJECTS AND SUMMARY OF THE INVENTION

Accordingly, it is an object of the present invention to provide a force and pressure sensor that overcomes the aforementioned problems and disadvantages of existing quartz resonating force and pressure transducers known in the prior art.

A further object of this invention is to provide a force and pressure sensor which is relatively inexpensive and easy to manufacture.

Another object of the present invention is to provide a force and pressure sensor having a high Q value, which ensures sensitivity and stability.

A still further object of the present invention is to provide a force and pressure sensor having high resolution, accuracy, and long-term stability.

Another object of the present invention is to provide a force and pressure sensor which, on account of its construction and the shape of the electrodes, facilitates the application of external forces.

Yet another object of the present invention is to keep undesired oscillations of the force and pressure sensor to the lowest level possible.

The present invention relates to a thin, piezoelectric membrane with circular or ring-shaped electrodes that is made to oscillate in a piezoelectric manner, whereby the oscillation frequency depends upon the size of the external force transferred to the membrane. In one embodiment according to the invention the membrane may be supported within a housing.

The above, and other objects, features, and advantages of the present invention will become apparent from the following detailed description of illustrated embodiments thereof to be read in conjunction with the accompanying drawings, in which like reference numerals represent the same or similar parts.

BRIEF DESCRIPTION OF THE DRAWINGS

FIG. 1a is a side elevational view of a membrane according to an embodiment of the present invention having one possible electrode layout and which is piezoelectrically excited to oscillate;

FIG. 1b is a top plan view of the membrane of FIG. 1a;

FIG. 1c is a diagramatic representation of a side elevation of the membrane of FIG. 1a being deformed by forces applied thereto;

FIG. 2a is a side elevational view of a membrane according to another embodiment of the present invention having another electrode layout and being piezoelectrically excited to oscillate;

FIG. 2b is a top plan view of the membrane of FIG. 2a;

FIG. 2c is a diagramatic representation of a side elevation of the membrane of FIG. 2a being deformed by a force applied thereto;

DETAILED DESCRIPTION OF PREFERRED EMBODIMENTS

Figure 3A:
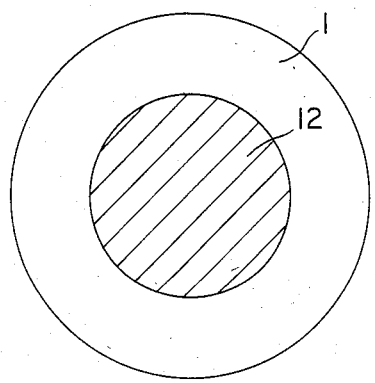
FIGS. 3a and 3b are top plan view representations of membranes according to the present invention having disc-shaped and ring-shaped electrodes, respectively.

FIGS. 1a and 1b show the actual "sensing element" of the inventive resonating force and pressure transducer, which consists of quartz disk 1, on which metal electrodes 2, 3 have been installed on opposite faces. Via electrical contact points 4, 5, the quartz can be electrically excited to oscillate. By means of an AT cut (of the quartz crystal) and the electrode layout shown, a pure thickness shear mode can be generated which, in essence, occurs only in that area of the quartz which is jointly covered by both electrodes. Quartz of this kind is known for the fact that it is not very temperature-dependent, and that it undergoes only little attenuation. FIG. 1c shows the deformed membrane, in which the deformation of the quartz disk, caused by one or more forces or distributed pressure, changes the natural frequency of the quartz membrane in a clear manner and, thus, a similar membrane can be used for both force and pressure transducers.

FIGS. 2a and 2b show another form of the quartz membrane 7 with electrodes 2 and 3. Again, the membrane can be excited via contacts 4 and 5, so that it will oscillate. The natural frequency of the membrane changes again as a result of the deformation caused by the forces applied while quartz membrane 7 is held by an immovable object 6, as represented in FIG. 2c. Thus, again, a force transducer has been obtained.

Figure 3B:
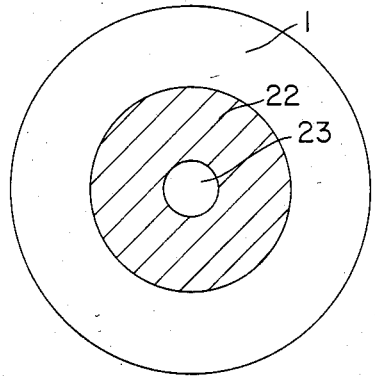

In order to create a suitable force and pressure transducer, it has to be possible to deform the quartz membrane without providing a large change in its Q value. Dependent upon the method and instrument of measurement, two electrode shapes are suitable, as shown in FIGS. 3a and 3b. The closed electrode surface 12 in FIG. 3a is, above all, appropriate for measuring the pressure of gases, or for measuring forces which are transferred via a needle or stylus to the center of the quartz membrane 1. If impact surfaces with larger areas are required, it will be necessary to use a ring-shaped electrode surface 22 for transferring external forces with low attenuation to the membrane, as shown in FIG. 3b. By means of this ring-shaped electrode geometry, one obtains a virtually oscillation-free area 23 in the center of the membrane, to which the external force can be applied.

Figure 4:
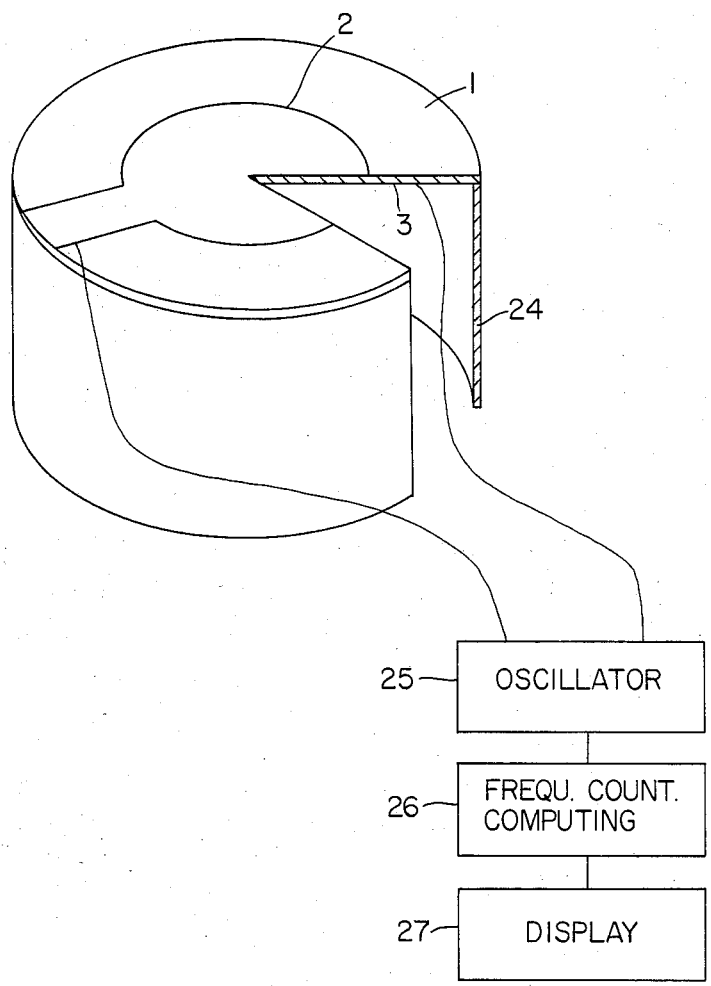
FIG. 4 is a perspective and schematic representation of an embodiment of the invention affixed to a mounting ring.

FIG. 4 illustrates the use of the membrane according to FIG. 3a as a pressure transducer. The quartz membrane 1 with electrode surfaces 2 and 3 is solidly attached to a quartz ring 24. The frequency of the quartz membrane determines the frequency of the oscillator 25, whose output signal is further processed in frequency counting and computing unit 26 until the pressure is represented on display 27.

Accordingly, for example, a quartz membrane with an AT cut 0.1 mm thick, a diameter of 14 mm, and an electrode diameter—for electrode 2—of 6 mm, will have, in an undeformed state, a natural frequency of around 17 MHz. When a pressure of 1 bar is applied to one side of the membrane, and there is a vacuum on the other side, a frequency change of 25 kHz will occur, corresponding to about 1500 ppm/bar. The degree to which the pressure depends on the frequency is essentially expressed in the following equation:

$$(f - f_0/f_0) = [1 + (\alpha p^{\frac{1}{2}})^2]^{\frac{1}{2}} - 1$$

where $f$ = frequency at pressure p,
$f_0$ = frequency at pressure p=0.

The quantity $\alpha$ contains the material constants and the geometry of the quartz membrane. In the case discussed, $\alpha = 0.05$. The value of the layout amounts to about 35,000. The pressure transducer shown in FIG. 4 can, for the appropriate size, be made as one piece.

Figure 5A:
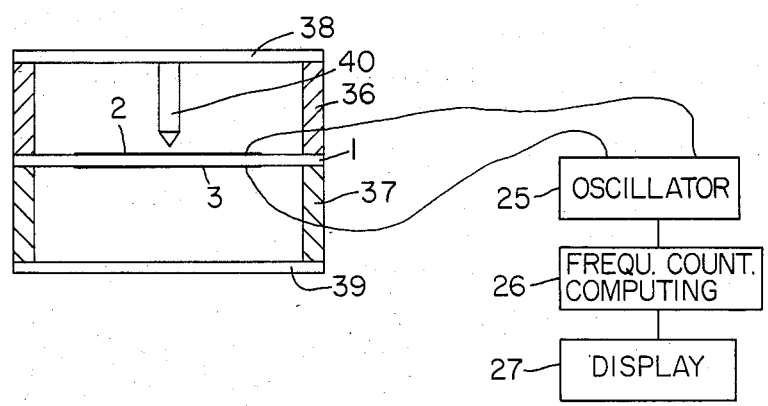
FIG. 5a is a side elevational view in cross section and a schematic representation of the present invention embodied as an absolute pressure meter.
Figure 5B:
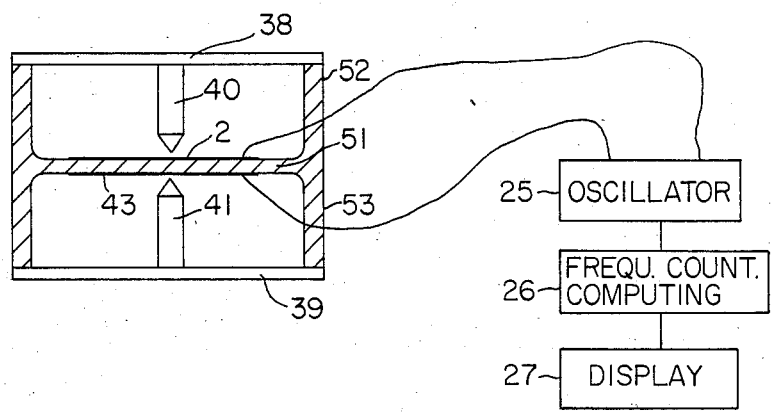
FIG. 5b is a side elevational view in cross section and a schematic representation of the present invention embodied as a differential pressure meter.

FIGS. 5a and 5b represent another way of packaging the quartz membrane and in FIG. 5a the basic element is again membrane 1 with electrodes 2 and 3, which lead again to oscillator 25.

The frequency output signal is again processed in frequency counting and computing unit 25, and the desired quantity represented on display 27.

The membrane 1 is solidly connected on both sides with rings 36 and 37 and two further membranes 38 and 39 close the measuring membrane off from the environment. Membrane 38 serves thereby for the force and pressure transfer, by means of a needle or stylus 40 contacting the measuring membrane 1. The embodiment of FIG. 5a can be used as a force transducer, as well as an absolute pressure transducer.

In contrast to FIG. 5a, the embodiment of FIG. 5b shows a layout that contains an additional needle 41, which transmits the deformation of membrane 39 to the measuring membrane 51. This layout is particularly appropriate for differential pressure measurements. Contrary to the embodiment of FIG. 5a, the measuring membrane 51 is integrally formed with rings 52, 53 in the embodiment of FIG. 5b, and the unit is made of one piece.

Tests performed with prototype models of this kind show, for instance, sensitivities of 600 ppm/N, whereby measuring membranes with a 14 mm diameter and a 0.1 mm thickness are used, while electrodes 2 have a 6 mm diameter. The degree to which the membrane frequency depends upon the force with which the needle deforms the measuring membrane can again be described by means of the equation indicated above, whereby the $\alpha$ value has been adjusted accordingly.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A force and pressure sensor operating as a piezoelectric resonator working in a thickness shear resonating mode comprising:
   a piezoelectric membrane formed of an AT cut quartz crystal having an electrode arranged on both sides, said electrodes being of a size to cover only a portion of the surface of the respective sides of said membrane and at least one of said electrodes being substantially ring-shaped having a central area void of electrode material, said electrodes being connected to an active oscillator circuit, said membrane being of substantially uniform thickness and having a natural frequency of a thickness shear vibration dependent upon deformation caused by force or pressure exerted perpendicularly to said membrane, and mounting means allowing the membrane to be fixed at its edge.

2. A force and pressure sensor according to claim 1, wherein the force or pressure transfer to said membranes occurs by means of a point means on the membrane surface having said ring-shaped electrode arranged thereon.

3. A force and pressure sensor according to claim 1, wherein the force or pressure transfer takes place in an area where said at least one electrode does not cover said membrane.

4. A force and pressure sensor according to claim 3, wherein said piezoelectric membrane and said mounting means are attached to one another so as to form one piece.

5. A force and pressure sensor according to claim 1, wherein said piezoelectric membrane and said mounting means are attached to one another so as to form one piece.

6. A force and pressure sensor according to claim 1, wherein said mounting means include a support consisting of a hollow body arranged on both sides of said membrane.

7. A force and pressure sensor according to claim 6, wherein said piezoelectric membrane and both supports are attached to one another so as to form one piece.

8. A force and pressure sensor according to claim 6, wherein said hollow-body supports of the piezoelectric membrane are closed off by additional membranes.

9. A force and pressure sensor according to claim 7, wherein said hollow-body supports of the piezoelectric membrane are closed off by additional membranes.

10. A force and pressure sensor according to claim 8, wherein at least one of said additional membranes is equipped with a device for direct force transfer to said piezoelectric membrane.

* * * * *